US007376325B1

(12) United States Patent
Cloud et al.

(10) Patent No.: US 7,376,325 B1
(45) Date of Patent: May 20, 2008

(54) CABLE CLOSURE AND ASSEMBLY

(75) Inventors: Randy Cloud, Mentor, OH (US); Chris Grubish, Solon, OH (US); Dan Levac, Bellville, OH (US); Mark Stransky, Munroe Falls, OH (US)

(73) Assignee: Preformed Line Products Company, Mayfield Village, OH (US)

( * ) Notice: Subject to any disclaimer, the term of this patent is extended or adjusted under 35 U.S.C. 154(b) by 0 days.

(21) Appl. No.: 11/678,439

(22) Filed: Feb. 23, 2007

(51) Int. Cl.
*G02B 6/00* (2006.01)
(52) U.S. Cl. .................. 385/135; 385/134; 385/136; 385/137
(58) Field of Classification Search ......... 385/134–137
See application file for complete search history.

(56) References Cited

U.S. PATENT DOCUMENTS 6,215,939 B1 * 4/2001 Cloud ....................... 385/135
7,130,519 B2 * 10/2006 Grubish et al. ............. 385/135

* cited by examiner

*Primary Examiner*—Frank G. Font
*Assistant Examiner*—Michael P. Mooney
(74) *Attorney, Agent, or Firm*—Amin, Turocy & Calvin, LLP

(57) ABSTRACT

The specification discloses a cable (e.g., fiber optic) housing assembly that facilitates securing cables and splices within its interior while providing a convenient work tray to assist a technician when splicing cables above ground level. The housing assembly can be equipped with a grommet and bobbin assembly that secures cables within the interior of the housing. Additionally, modular splice blocks can be configured within the interior of the housing in order to secure cable splices. In aspects, these modular splice blocks can be added as needed in a variety of configurations, including but not limited to, vertical stacking, horizontal back-to-back, or the like. The modular characteristics of the splice blocks enhance the as-needed extensibility of the housing assembly.

20 Claims, 14 Drawing Sheets

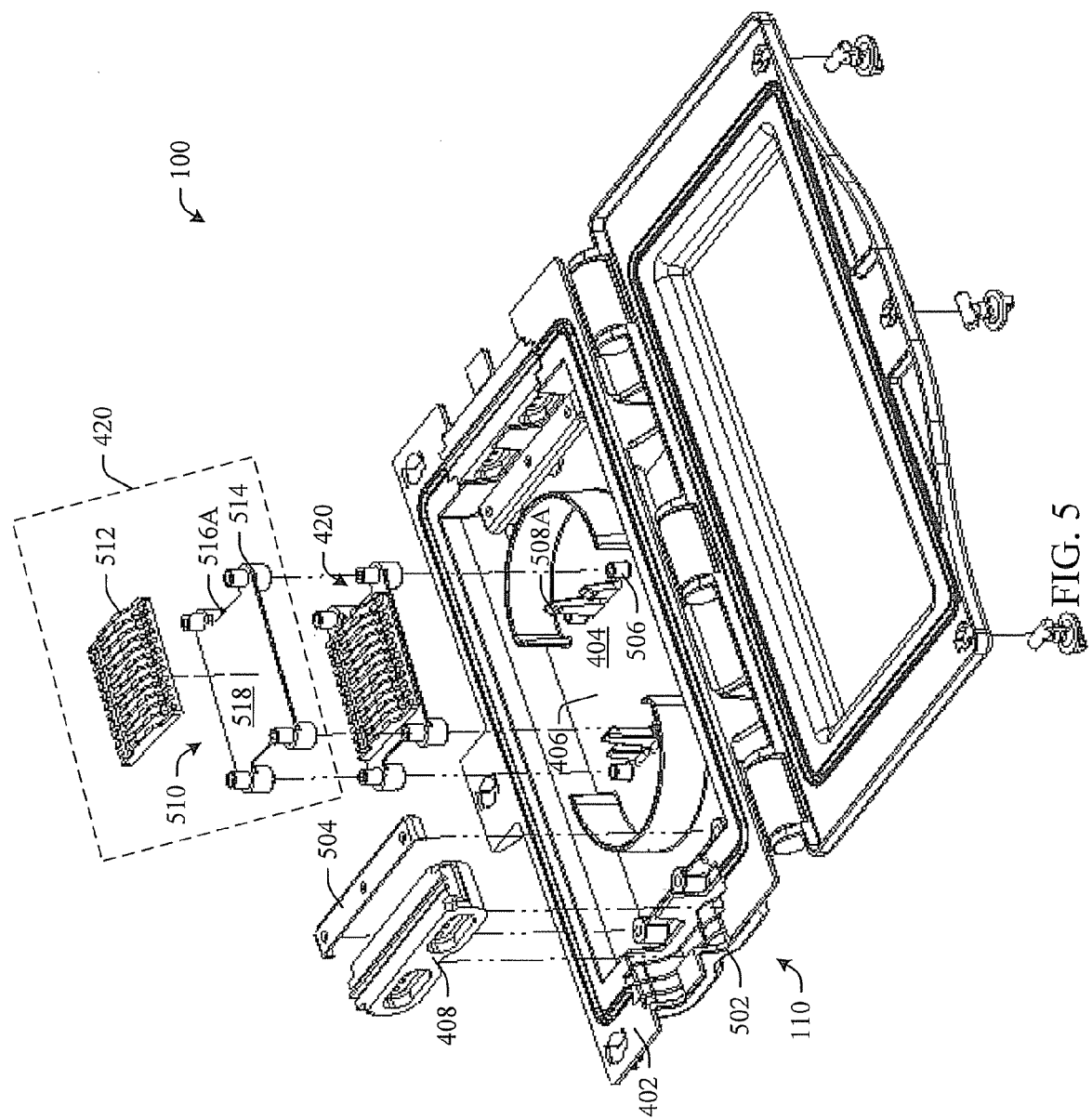

CABLE CLOSURE AND ASSEMBLY

BACKGROUND

A fiber optic cable is a glass or plastic fiber designed to guide light down its length by total internal reflection. Fiber optic cables are used in fiber-optic communication which permits digital data transmission over longer distances and at higher data rates than electronic communication.

The total internal reflection phenomenon, which occurs when light travels down a fiber optic core of a fiber optic cable, requires that the light rays reflecting off the boundary of the fiber optic core not exceed a critical angle of reflection at the boundary. This critical angle of reflection is determined by a ratio of indices of refraction of the fiber optic core and the cladding which surrounds the core and is made from a substance with an index of refraction greater than that of the core. To avoid letting the reflection angle exceed the critical angle, fiber optic cables should not curve at an angle sharper than a specified bend radius for the given fiber optic cable.

Fiber optic cables may be connected to each other by splicing, or joining two fibers together to form a continuous optical waveguide. In the field, technicians typically perform a mechanical splice whereby the fiber ends are aligned and held together with a sleeve often using a gel that enhances the transmission of light across the joint. A splice block is a device used for mechanically splicing two or more fiber optic cables together. A splice block is typically housed in an enclosure to protect the spliced fiber optic cable.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The specification, in one aspect thereof, discloses a cable (e.g., fiber optic) housing assembly that facilitates securing cables and splices within its interior while providing a convenient work tray to assist a technician when splicing cables above ground level. The housing assembly can be equipped with a grommet and bobbin assembly (or strength member retainer) that secures cables within the interior of the housing. Additionally, modular splice blocks can be configured within the interior of the housing in order to secure cable splices. In aspects, these modular splice blocks can be added as needed in a variety of configurations, including but not limited to, vertically stacked, horizontally back-to-back, or the like. The modular characteristics of the splice blocks can enhance the as-needed extensibility of the housing assembly.

One embodiment of the innovation comprises a base, at least one fiber optic cable receiver structure, a cover pivotally connected to the base, and at least two splice bracket assemblies. In some embodiments, the base includes walls defining an interior recess and at least two mounting portions extending from a bottom surface of the base. The fiber optic cable receiver structure may be located within one of the walls of the base and may include a plurality of holes configured to receive a fiber optic cable. The at least two splice bracket assemblies may attach to at least one of the mounting portions of the base, and may be secured to the base by a frictionally engaging mechanism. The base, the at least one fiber optic cable receiver structure, and the cover may be configured to surround the interior recess of the base.

Another embodiment comprises a base, at least two grommet housings, and a cover. In this embodiment, the base includes sidewalls defining an interior space, at least two semicircular ribs extending upwardly from a bottom surface of the base, and at least two mounting portions extending upwardly from the bottom surface of the base and located between the at least two semicircular ribs. The at least two grommet housings are received by apertures in opposing portions of the sidewalls, and each receive at least one grommet, the grommets each having a plurality of holes configured to receive a fiber optic cable. The cover engages a surface of the sidewalls and engages a surface of each of the at least two grommet housings.

Yet another embodiment comprises mounting a splice bracket assembly onto a mounting portion of an injection molded base of a fiber optic housing assembly, running the fiber optic cable through a hole of a grommet received by the fiber optic housing assembly, clamping the fiber optic cable to an outside surface of a cylinder, the cylinder being inside the fiber optic housing assembly, securing the fiber optic cable to the splice bracket assembly, and closing a cover of the fiber optic housing assembly to enclose the splice bracket assembly.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

FIG. 5 is an exploded perspective view of a fiber optic housing assembly in an open position according to an example embodiment.

DETAILED DESCRIPTION OF EXAMPLE EMBODIMENTS

Figure 1A:
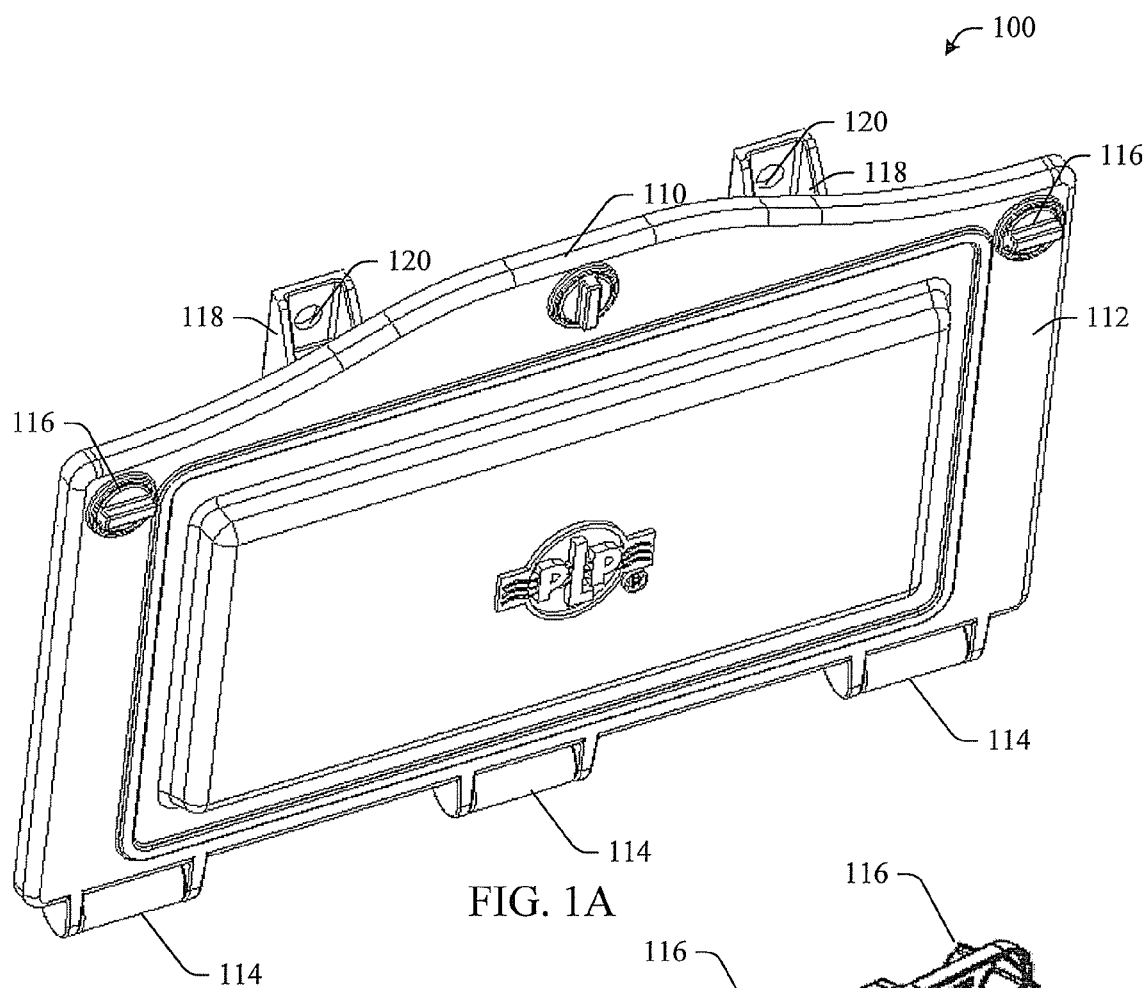
FIGS. 1A and 1B are perspective views of a fiber optic housing assembly in a closed position according to example embodiments.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

Figure 1B:
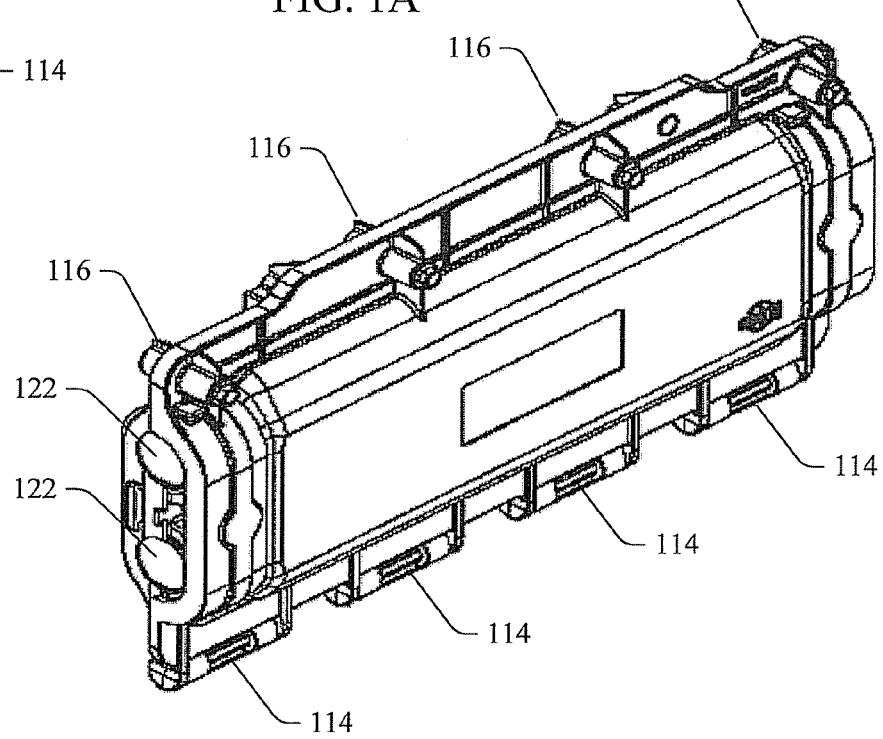

FIGS. 1A and 1B are perspective views of fiber optic housing assemblies 100 in a closed position according to example embodiments. While reference is made herein to housing fiber optic cables, embodiments of the fiber optic housing assembly 100 discussed herein could also be used to house other types of cables, such as copper cables. As such, these alternative embodiments are to be included within the scope of this disclosure and claims appended hereto. As illustrated, while the housing assemblies shown in FIGS. 1A and 1B differ in appearance, it is to be understood that the concepts described herein can be applied to most any housing assembly without departing from the spirit and/or scope of the innovation.

The fiber optic housing assembly 100 shown in FIG. 1 may be waterproof or airtight, except for one or a plurality of passageways for fiber optic cables, enabling the fiber optic cables to run through the passageways for storage and protection of spliced portions. However, in other aspects, it is to be understood that the passageways can be configured to provide a waterproof and/or airtight seal as desired. Portions of the fiber optic housing assembly 100 may be injection molded, and may be made of plastic or other suitable rigid material.

The fiber optic housing assembly 100 may include a base 110 and a cover 112. The base 110 may be injection molded, and may be made of plastic or other rigid material. As will be better understood upon a review of the figures that follow, the base 110 may provide room or space for housing spliced fiber optic cables.

The cover 112 may be injection molded, and may be made of plastic or other rigid material. The base 110 and the cover 112 may be configured so that the cover 112 may be sealingly engaged to the base 110. When in a closed position, the cover 112 may form a waterproof and/or airtight seal with the base 110.

The cover 112 may be pivotally connected or hingedly attached to the base 110. As well, it is to be understood that other connection techniques can be employed without departing from the spirit and/or scope of the innovation. In the example shown in FIG. 1, the cover 110 and base 112 are pivotally connected by a hinge mechanism 114. The components of the hinge mechanism 114 may be part of the injection molded base 110 and/or cover 112, or may be separate components attached to the base 110 and cover 112. The hinge mechanism 114 may, for example, include a hinge barrel and a hinge base, with one of these two components each being a component of the base 110 and the cover 112.

In the example of FIG. 1, the pivotal connection between the cover 112 and the base 110 may be configured to prevent the cover 112 from pivoting more than approximately ninety degrees away from the base 110. For example, a retaining strap (not shown) can be employed to connect the cover 112 to the base 110 thereby ensuring a maximum pivot of approximately ninety degrees. Other stops and hinging mechanisms can be employed to ensure this maximum pivot without departing from the scope of this disclosure. Additionally, although not illustrated, a tether may also be included to hold the strap which connects the cover 112 to the base 110 in order to hold the cover 112 as a horizontal shelf while the base 110 is mounted.

As will be understood, this configuration may enable the cover 112 to serve as a workspace for placing tools when the base 110 is located above a ground surface, such as on a wall or pole. In an alternative embodiment, the pivotal connection between the cover 112 and the base 110 may be configured so that the cover 112 detaches from the base 110 when the cover 112 pivots to a predefined angle (e.g., approximately two-hundred and forty degrees) away from the closed position.

The fiber optic housing assembly 100 may include fasteners, such as lock buttons 116, for securing or locking the cover 112 to the base 110 in the closed position. Locking the cover 112 to the base 110 may prevent the fiber optic housing assembly 100 from opening and exposing the protected components to damage. The lock buttons 116 may be attached to the cover 112, or may be easily removable from the cover 112 when the cover 112 is unlocked from the base 110. While the embodiment shown in FIG. 1 has three lock buttons 116, it is envisioned that the fiber optic housing assembly 100 could have other numbers, such as at least one fastener or a plurality of fasteners, and still secure the cover 112 to the base 110.

The fiber optic housing assembly 100 may include one or more tabs 118 for securing the fiber optic housing assembly 100 above a ground surface, such as to a wall or a post. The tab 118 may extend from the base 110, and may either be part of the injection molded base 110, or may be a separate component attached to the base 110. The tab 118 may have an opening or hole 120 configured to receive a fastener, such as a screw, nail, bolt or the like, for mounting the fiber optic housing assembly 100 above the ground surface.

Figure 2A:
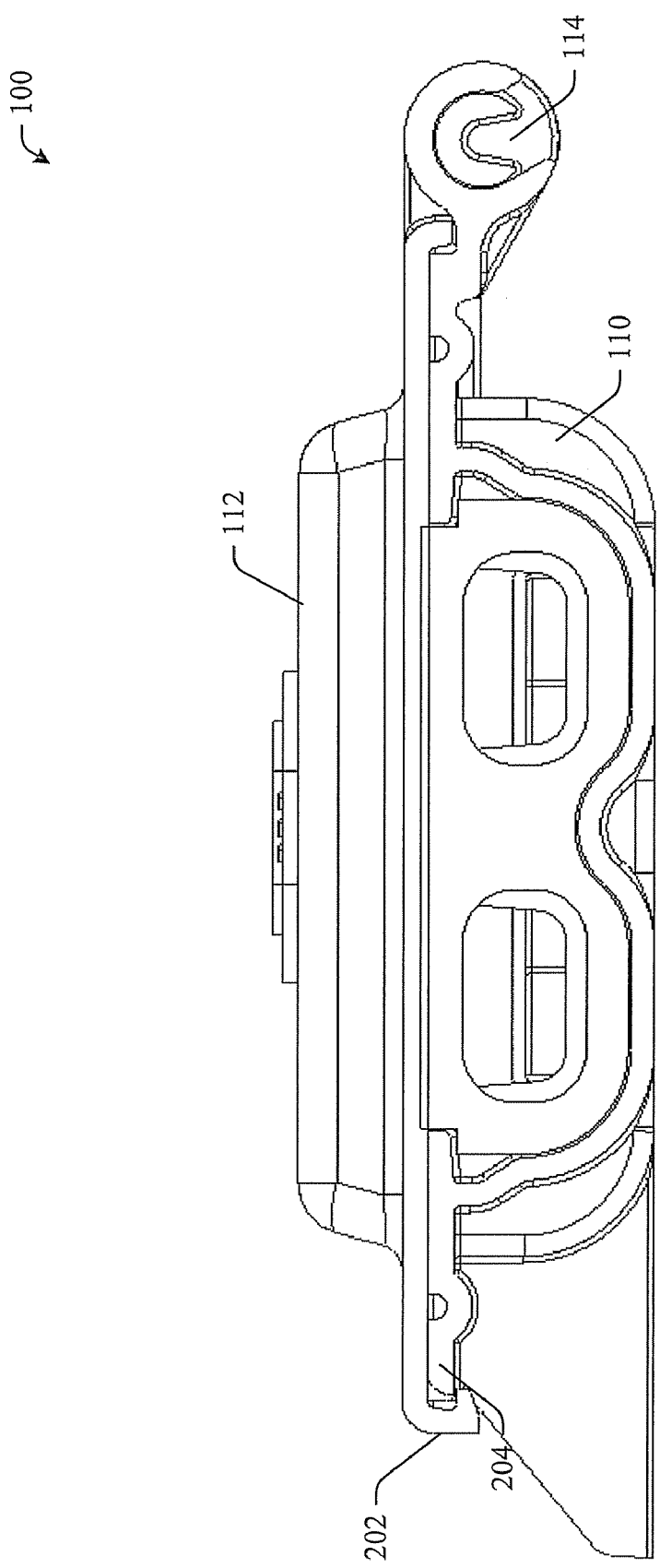
FIGS. 2A and 2B are side views of fiber optic housing assemblies in closed positions according to two different example embodiments.

FIG. 2A is a side view of a fiber optic housing assembly 100 in a closed position according to an example embodiment. In the example embodiment shown in FIG. 2A, the cover 112 is pivotally connected to the base 110 by the hinge 114. In this example, the cover 112 is locked in the closed position by a snap-fit locking mechanism which includes a hook 202 and a receiver tab 204. The snap-fit locking mechanism utilizes the inherent flexibility of the hook 202 to stretch away from the receiver tab 204 when the cover 112 is pressed closed over the base 110. When the cover 112 is pressed closed over the base 110, the hook 202 stretches outward as the hook 202 slides across the receiver tab 204, until the hook 202 passes the receiver tab 204, at which time the hook 202 springs back into a locked position over the receiver tab 204. To open the cover 112, the hook 202 can be stretched or flexed away from the receiver tab 204, which frees the cover 112 for pivoting away from the base 110 via hinge mechanism 114. In the embodiment shown in FIG. 2A, the hook 202 is part of the cover 112 and the receiver tab 204 is part of the base 110; however, it is envisioned that these components could be switched without loss of functionality.

Figure 2B:
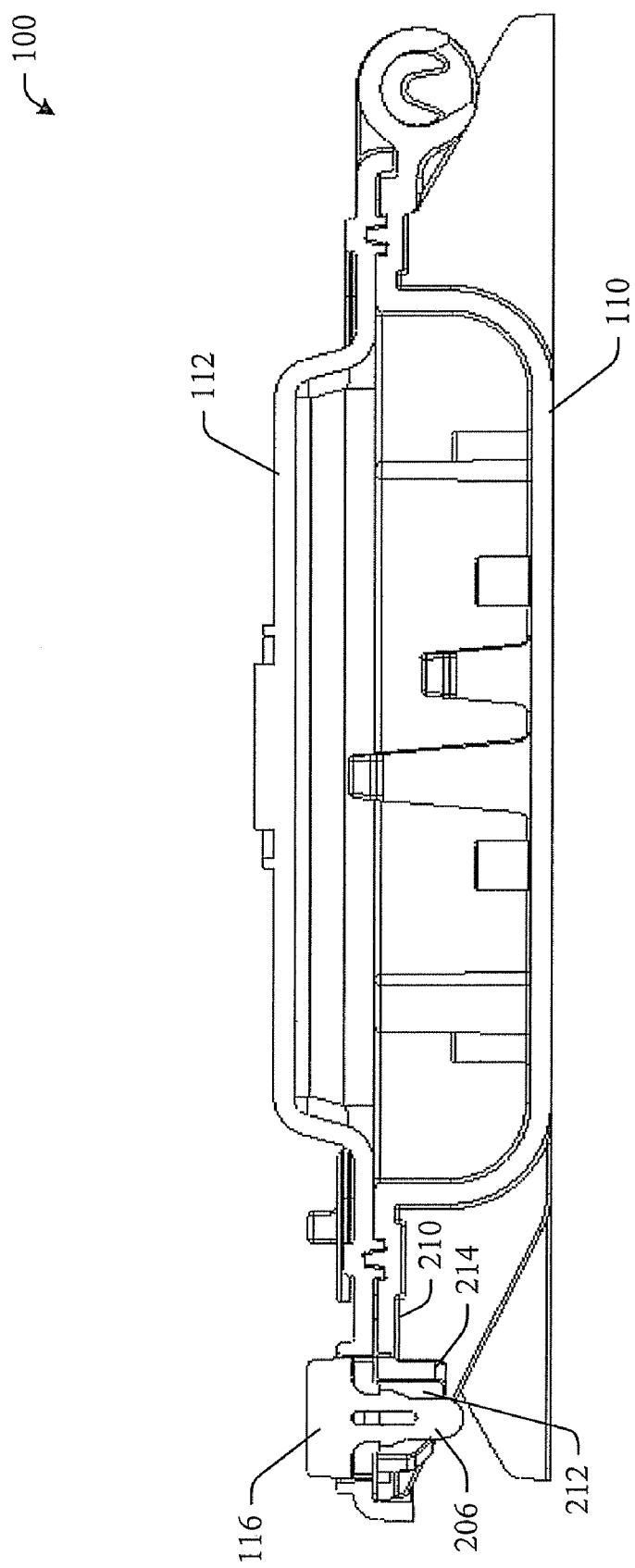

FIG. 2B is a side view of a fiber optic housing assembly 100 in a closed position according to another example embodiment. In this embodiment, the cover 112 includes a lock button 116 with a tooth 206. The tooth 206 may be a cylinder extending along a line parallel to the top of the lock button 116, and may be used to lock the cover 112 to the base 110. The base 110 may have a locking tab 210 which acts as a means of securement to the locking button 116. The locking tab 210 may have a hole 212 which receives a portion of the lock button 116. In the embodiment shown in FIG. 2B, the top of the lock button 116 is above the hole 212, and the tooth 206 is below the hole 212 when the fiber optic housing assembly 100 is in the closed, locked position. The locking tab 210 may have an uneven surface 214 around the hole 212. The uneven surface 214 may frictionally engage the tooth 206, and may lock the cover 112 to the base 110 when the lock button 116 is turned, for example, one quarter-turn. While FIG. 2B shows the lock button 116 connected to the cover 112 and the locking tab 210 as part of the base 110, it is envisioned that the lock button 116 could be connected to the base 110 and the locking tab 210 part of the cover 112 in other example embodiments.

Figure 3:
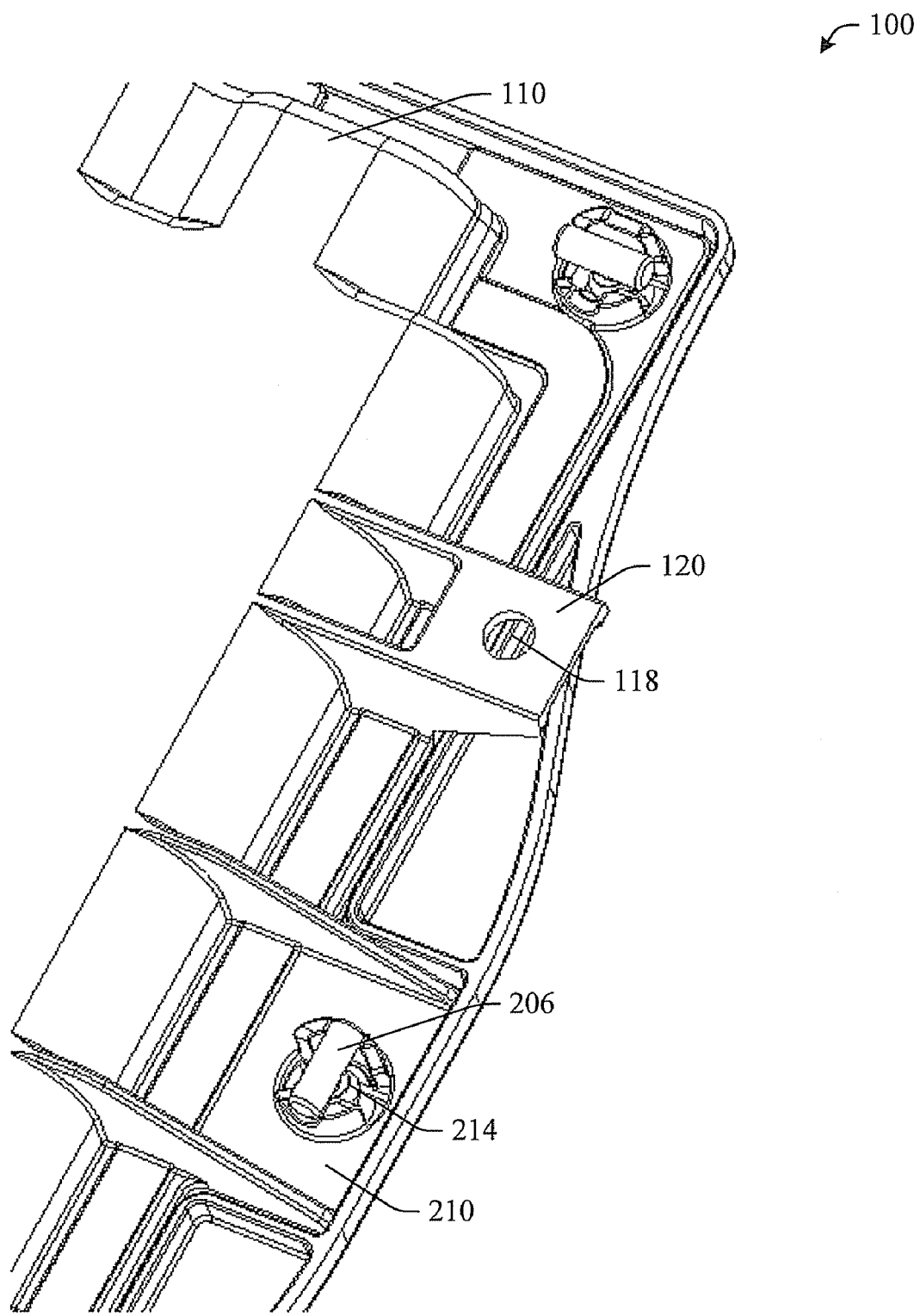
FIG. 3 is a bottom perspective end view of the fiber optic housing assembly in a closed position according to the example embodiment shown in FIG. 2B.

FIG. 3 is a bottom perspective end view of a portion of the fiber optic housing assembly 100 in a closed position according to the example embodiment shown in FIG. 2B. This view shows the uneven surface 214 of the locking tab 210 in greater detail. As shown in FIG. 3, the uneven surface 214 may have a gradual upward slope for approximately one-quarter of a turn, then slope downward slightly, followed by a sharp upward slope. This allows the tooth 206 to slide along the uneven surface 214 for one-quarter of a turn, and then rest in the locked position. While the embodiment shown in FIG. 3 causes the lock button 116 to lock after one-quarter of a turn, it is envisioned that the locking tab 210 could be configured to cause the lock button 116 to lock after different amounts of turning.

Figure 4:
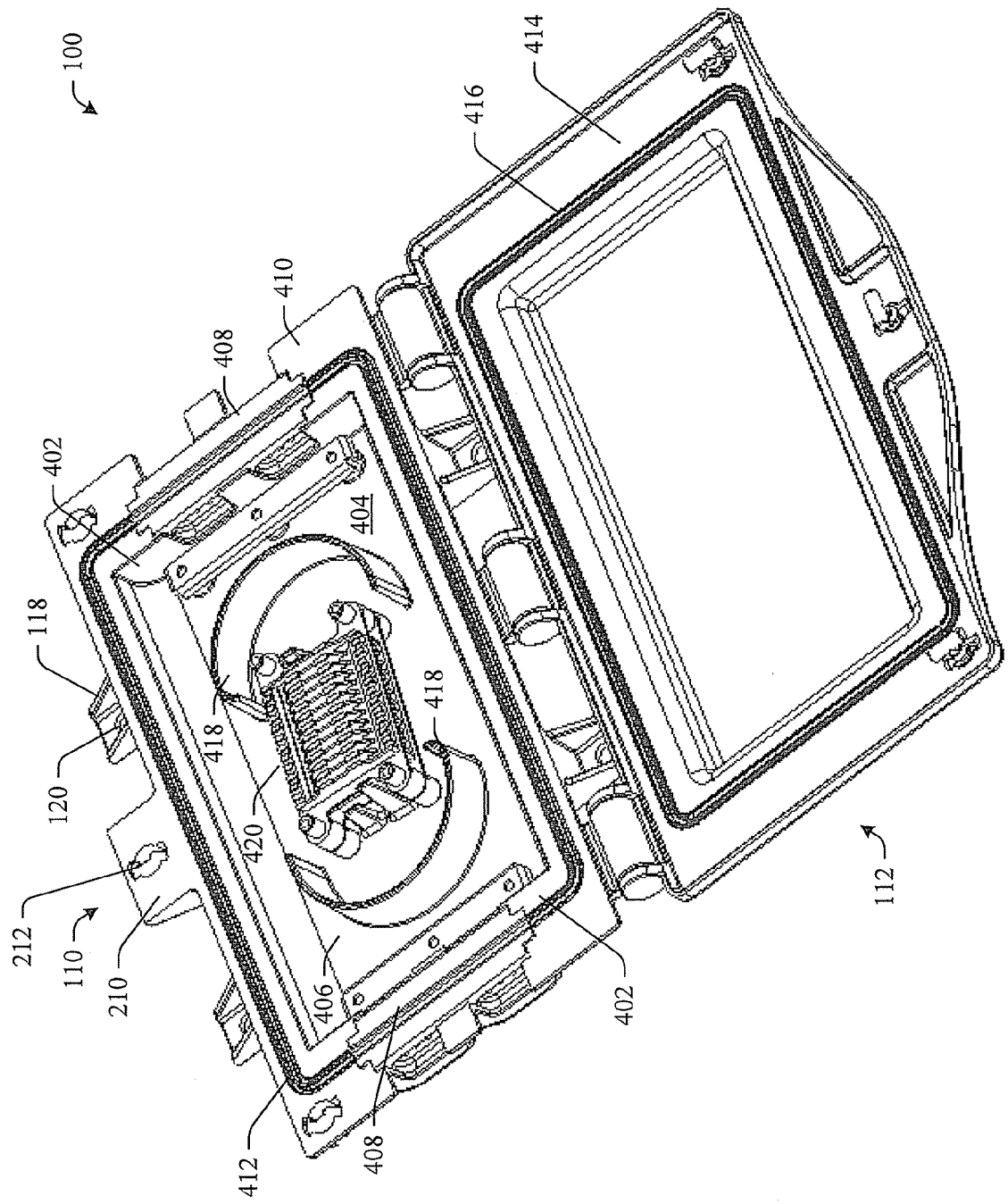
FIG. 4 is a perspective view of a fiber optic housing assembly in an open position according to an example embodiment.

FIG. 4 is a perspective view of fiber optic housing assembly 100 in an open position according to an example embodiment. In this view, the cover 112 has been opened to show the contents of the base 110. FIG. 4 shows an interior side of the base 110 and an interior side of the cover 112.

In the example embodiment shown in FIG. 4, the base 110 has walls such as sidewalls 402 extending in a generally vertical direction with reference to the base 110 and cover 112, which may be considered to be lying horizontally. In this example, the sidewalls 402 are generally rectangular, and form a perimeter of the base 110. The sidewalls 402 may define an interior recess 404, interior recessed portion, or interior space of the base 110. The interior recess 404 may be used to store spliced fiber optic cables. A bottom surface 406 of the base 110 may define a lower boundary of the interior recess 404. The bottom surface 406 is shown as flat, but could be curved in alternative embodiments.

The fiber optic housing assembly 100 may include at least one, and in the example shown in FIG. 4, two, fiber optic cable receiver structures 408. The fiber optic cable receiver structures 408 (e.g., grommets) may include passageways configured to allow fiber optic cable to pass through the fiber optic cable receiver structures 408 from outside the fiber optic housing assembly 100 into the interior recess 404. The fiber optic cable receiver structures 408 may be separate components from the base 110. By utilizing fiber optic cable receiver structures 408 that are separate components from the base 110, a technician may thread the fiber optic cable through the fiber optic cable receiver structure 408, splice the fiber optic cable and secure the fiber optic cable within the interior recess 404, and insert the fiber optic cable receiver structures 408 into the base 110. The fiber optic cable receiver structures 408 may be placed in such a position in the base 110 that they align with the sidewalls 402. By aligning with the sidewalls 402, the fiber optic cable receiver structures 408 may engage with the cover 112 when the fiber optic housing assembly 100 is in the closed position.

The sidewalls 402 and the fiber optic cable receiver structures 408 may each have a planar surface 410, and the planar surfaces 410 of the sidewalls 402 and the fiber optic cable receiver structures 408 may be parallel, causing the planar surface 410 to be continuous along the transitions from the sidewalls 402, across the fiber optic cable receiver structures 408, and back to the sidewalls 402. The planar surface 410 may be flat, and may form an upper surface portion of the base 110 extending outwardly from the sidewalls 402. The planar surface 410 may be parallel to the bottom surface 406. The locking tabs 210 may be part of the planar surface 410, or may be separate extensions from the base 110.

The base 110 and fiber optic receiver structures 408 may include a groove 412. The groove 412 may be continuous across the planar surface 410 of the sidewalls 402 and fiber optic receiver structures 408, and may follow a pattern of the sidewalls 402, such as a generally rectangular pattern.

The interior side of the cover 112 may include a planar surface 414. This planar surface 414 may be flat, and may follow a pattern corresponding to the pattern of the planar surface 410 of the base 110. The planar surface 414 on the interior side of the cover 112 may be configured to engage with the planar surface 410 of the base 110 when the fiber optic housing assembly 100 is in the closed position. The planar surface 414 of the interior side of the cover 112 and the planar surface 410 of the base 110 may be configured so that when the fiber optic housing assembly 100 is in the closed position, the planar surfaces 410, 414 are in continuous contact around a perimeter of the fiber optic housing assembly 100. This continuous contact may form a waterproof or airtight seal.

The cover 112 may also include a flange 416 extending from the planar surface 414, such as in a perpendicular direction from the planar surface 414. The flange 416 may form a continuous shape along the planar surface 414, such as a loop or a rectangle, and may correspond in shape to the groove 412 of the base 110. The flange 416 may be configured to interlock with the groove 412 when the fiber optic housing assembly 100 is in a closed position, and may form a waterproof or airtight seal.

The base 110 may include at least one, and in the embodiment shown in FIG. 4, two, ribs 418 extending from the bottom surface 406. The ribs 418 may be semicircular, and may have a radius of curvature configured to prevent the fiber optic cable from curving at an angle sharper than its bend radius. In the example embodiment shown in FIG. 4, the ribs 418 are half-circles with a radius of approximately 1.5 inches. A greater radius would still prevent the fiber optic cable from curving at an angle sharper than its bend radius, but a smaller radius could risk allowing the fiber optic cable to curve at an angle sharper than its bend radius. In the example shown in FIG. 4, an open portion of the ribs 418 faces toward a center of the base 110.

In the example embodiment shown in FIG. 4, a splice bracket assembly 420 is mounted onto the base 110. The splice bracket assembly 420 is located between the ribs 418, with the open portion of the ribs 418 facing the splice bracket assembly 420, to allow the fiber optic cable to benefit from the radius of curvature of the ribs 418. In the example shown in FIG. 5 that follows, it can be clearly seen that a second splice bracket assembly 420 is mounted on top of the splice bracket assembly 420 that is mounted onto the base 110. The splice bracket assembly 420 shown in FIG. 4 is discussed in greater detail with reference to FIGS. 5 and 7 infra.

FIG. 5 is an exploded perspective view of the fiber optic housing assembly 100 in the open position according to an example embodiment. In the example shown in FIG. 5, the sidewalls 402 have apertures 502 configured to receive the fiber optic receiver structures 408. In this example, the apertures 502 are at opposing ends of the base 110. With apertures 502 receiving fiber optic receiver structures 408 at opposing ends of the base 110 of the fiber optic housing assembly 100, the fiber optic cable may enter one end of the fiber optic housing assembly 100, be spliced and secured at the splice bracket assembly 420 near the center of the fiber optic housing assembly 100, and exit the opposite end of the fiber optic housing assembly 100. However, it is envisioned that the fiber optic housing assembly 100 could include only one fiber optic receiver structure 408, and that the fiber optic cable could enter and exit the same fiber optic receiver structure 408.

A strength member 504 may be secured to the base 110 near each of the apertures 502. The strength member 504 may serve to secure the fiber optic cable in a fixed position upon entrance into the interior recess 404.

The base 110 may further include mounting portions 506 extending from the bottom surface 406 of the base 110. The mounting portions 506 may be configured to be received by the splice bracket assembly 420, and may serve to mount the splice bracket assembly 420 to the base 110. The mounting portions 506 may be pegs that are part of the injection molded base 110, and may be round, square, or any other shape that is configured to be received by the splice bracket assembly 420. As well, the mounting portions 506 may be modular such that they permit location of the splice bracket assembly 420 in various locations within interior recess 404. In alternative embodiments, in order to assist in splicing the fiber, it is to be understood that mounting portions similar to 506 can be included onto the cover 112 such that a technician can mount the splice bracket assembly 420 on this cover-shelve to perform the splicing. Although not illustrated, this alternative configuration is to be included within the scope of the disclosure and claims appended hereto.

The splice bracket assembly 420 may be secured to the bottom surface 406 of the base 110 by frictional engagement, such as by a frictionally engaging mechanism (e.g., tapered pins), a frictionally engaging hook mechanism or the like. A second splice bracket assembly 420 (shown in exploded form) may be secured to the splice bracket assembly that is secured to the base 110 by a similar frictional engagement mechanism; multiple splice bracket assemblies 420 may be stacked on top of each other as high as a technician desires. The frictionally engaging mechanism may include a hook and loop or a hook and tab mechanism, with either of the two components being part of the base 110 and the splice bracket assembly 420. In the example shown in FIG. 5, at least one, such as two, hooks 508A extend from the bottom surface 406 of the base 110. The hooks 508A may be flexible enough to frictionally engage with at least one, such as two, portions of the splice bracket assembly 420 and secure the splice bracket assembly 420 to the bottom surface 406 of the base 110.

In the embodiment shown in FIG. 5, the splice bracket assembly 420 includes a mounting portion 510 and a splice block 512. The splice blocks 512 may be secured to a mounting surface 518 of the mounting portion 510 by an adhesive, or by use of fasteners such as screws, pins, bolts or the like.

In the embodiment shown in FIG. 5, the mounting portion 510 includes at least one, and in this case four, apertures 514 configured to receive the mounting portions 506 of the base 110. The apertures 514 may be configured to fit snugly over the mounting portions 506, and may be further configured to allow one splice bracket assembly 420 to be stacked on top of another splice bracket assembly 420.

The mounting portion 510 may further include a component of the frictional engagement mechanism configured to secure the splice bracket assembly 420 to the bottom surface 406 of the base 110, such as at least one, such as two, tabs 516A configured to engage the hook 508A. In this example, the splice bracket assembly 420 may be pushed down toward the bottom surface 406, forcing the hooks 508A outward until the tabs 516A move past the edges of the hooks 508A. Once the tabs 516A have moved past the edges of the hooks 508A, the hooks 508A may spring back into their normal position, locking the splice bracket assembly 420 in place. To remove the splice bracket assembly 420, at least one of the hooks 508A may be pushed outward before the splice bracket assembly 420 is lifted away from the base 110.

Figure 6A:
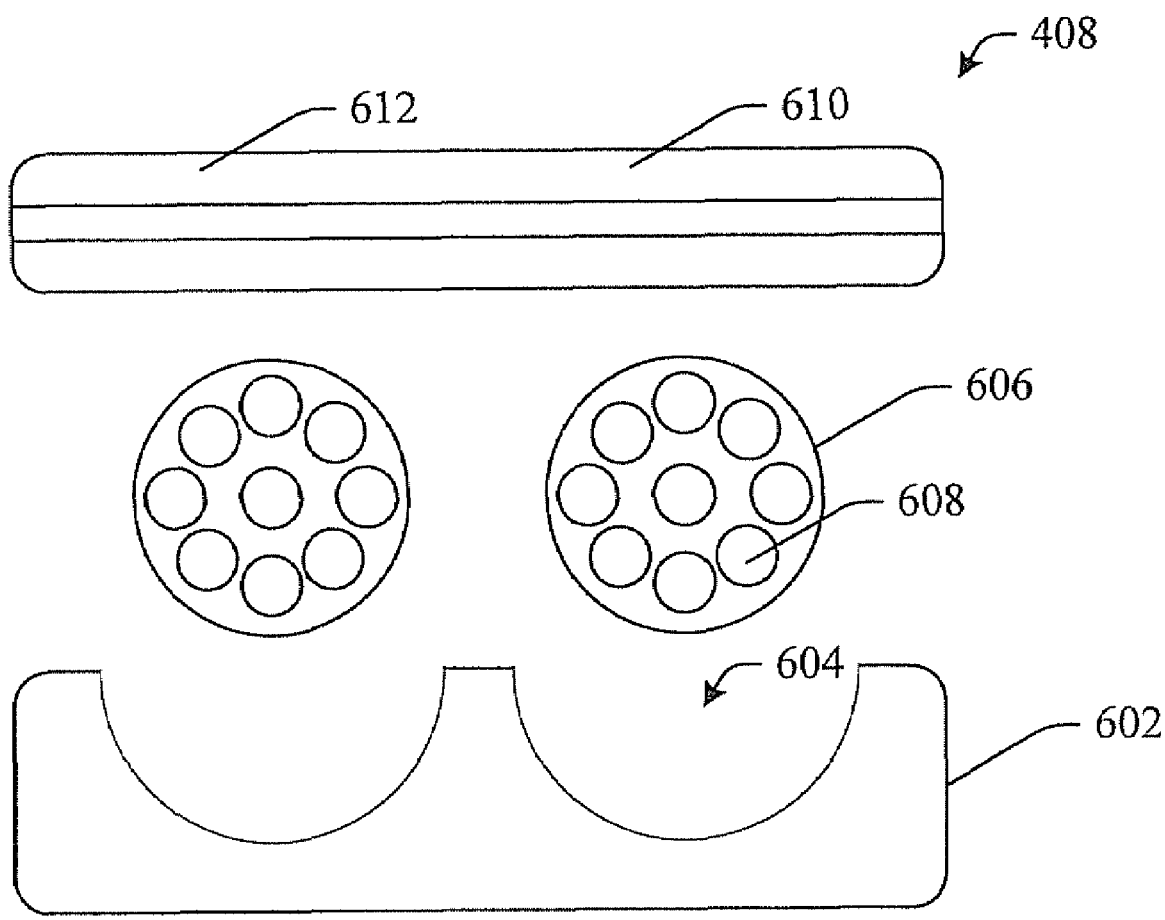
FIG. 6A is an exploded view of a fiber optic cable receiver structure according to an example embodiment.

FIG. 6A is an exploded view of the fiber optic cable receiver structure 408 according to an example embodiment. In this example, the fiber optic cable receiver structure 408 may include a grommet housing 602 configured to be received by the apertures 502 (not shown in FIG. 6A but shown in FIG. 5), which grommet housing 602 may be injection molded, such as injection molded plastic. The grommet housing 602 may include apertures 604 configured to receive at least one, and in the example shown in FIG. 6A, two, grommets 606. While receiving structure 408 is illustrated as having apertures 604, it is to be appreciated that the apertures can be pre-equipped with 'breakaways' or 'breakout' tabs (illustrated in FIG. 1B as item 122). These tabs can be 'knocked out' as needed while maintaining an environmental barrier if left in tact.

The grommets 606 may be configured to receive the fiber optic cable, such as by allowing the fiber optic cable to pass through the grommets 606. The grommets 606 may each include a plurality of openings or holes 608 configured to receive the fiber optic cable(s) or allow the fiber optic cable(s) to pass through the grommets 606. The grommets 606 may serve as the point of entry or exit for the fiber optic cable from the fiber optic housing assembly 100.

A tab 610 of the fiber optic cable receiver structure 408 may be configured to rest on the grommet housing 602 and secure the grommets 606 within the apertures 604. The tab 610 may include a planar surface 612 which, when the tab 610 is resting on the grommet housing 602, may be parallel to the planar surface 410 of the base 110.

Figure 6B:
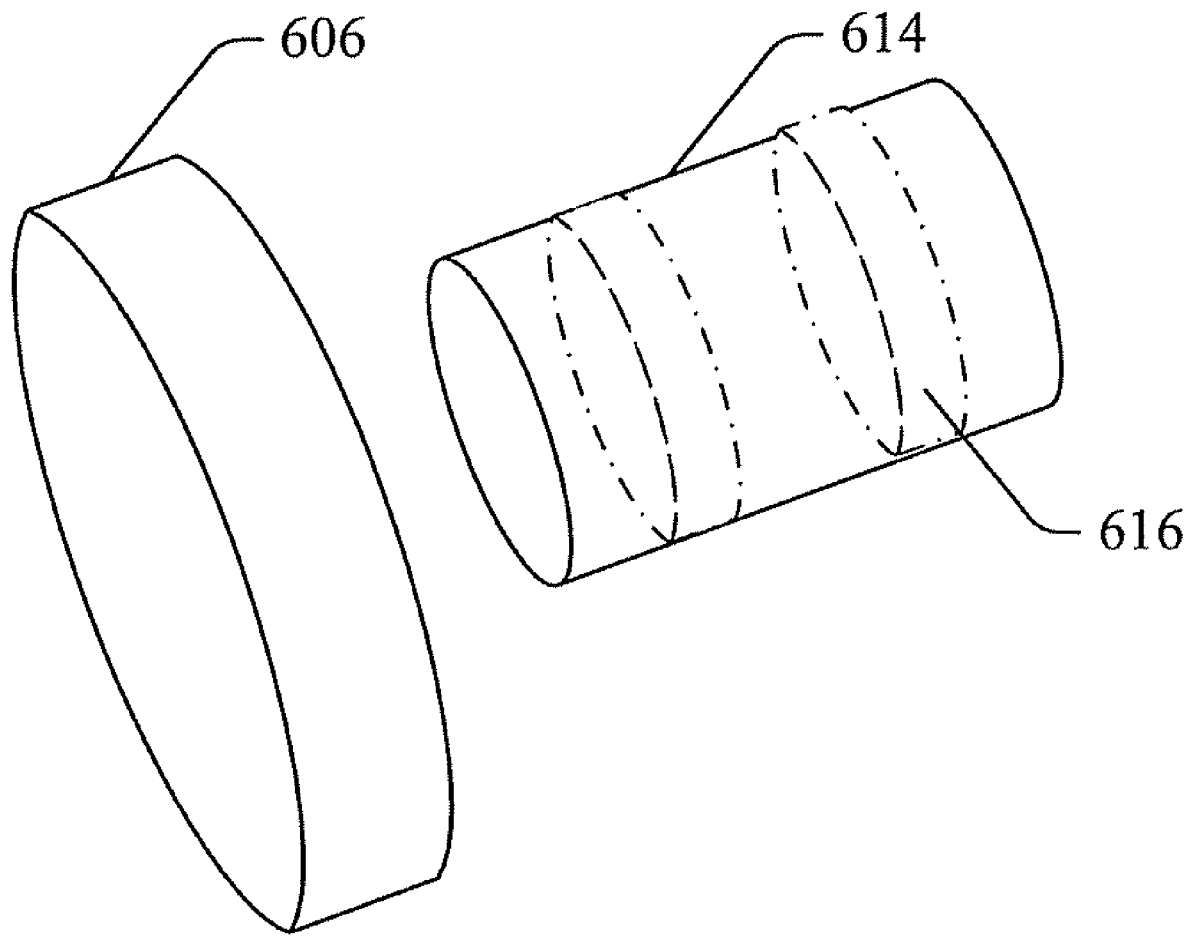
FIG. 6B is a perspective view of a strength member retainer (e.g., bobbin) according to an example embodiment.

FIG. 6B is a perspective view of a clamped cylinder 614 which may serve as a bobbin or strength member retainer according to an example embodiment. The cylinder 614 may be made of a flexible material such as plastic or rubber, and may serve to secure the fiber optic cable as the fiber optic cable passes through one of the grommets 606. Once the fiber optic cable(s) enter the interior portion of housing 100, the strength members of the fiber optic cable may be placed around the cylinder 614. A clamp 616 may be used to secure or clamp the strength members of the fiber optic cable to the flexible cylinder 614. The clamp 616 may be metal, such as wire, sheet metal, or even a 'bottle cap' type retaining device.

Figure 6C:
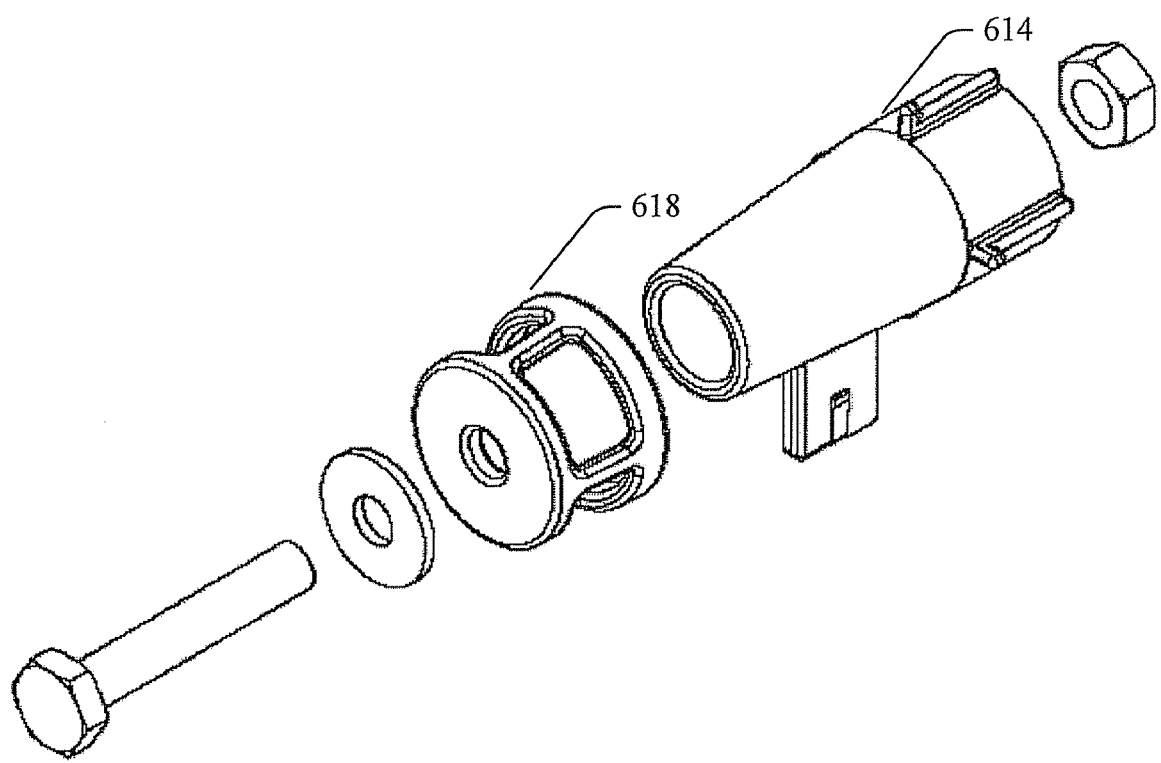
FIG. 6C is a perspective exploded view of an example strength member retainer in accordance with the innovation.
Figure 6D:
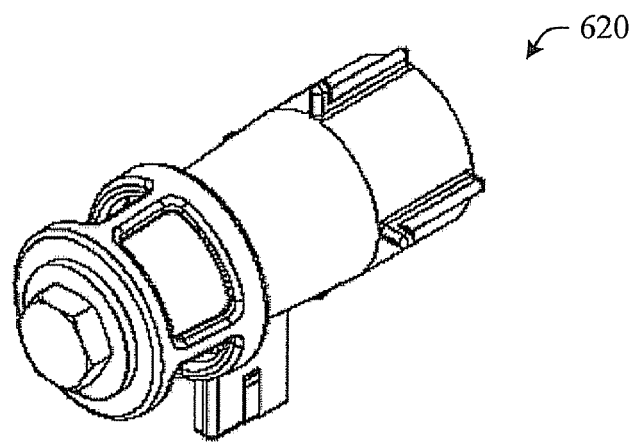
FIG. 6D is a perspective view of an example strength member retainer in accordance with the specification.

This 'bottle cap' configuration is illustrated in an exploded view as well as assembled view in FIGS. 6C and 6D respectively. More particularly, as shown in FIG. 6C, the cylinder 614 can be used in conjunction with cap 618 to secure the strength members of the fiber optic cable. As further illustrated, hardware can be employed to secure the cap 618 to one end of the cylinder 614. Although hardware is illustrated in FIGS. 6C and 6D, it is to be understood that other fastening means can be employed without departing from the spirit and scope of the innovation, for example, press-fit mechanisms, clamping devices, etc.

In aspects, the clamp 616 or 'bottle cap' 618 can be plastic, rubber or other suitable material. With reference again to FIG. 6B, the cylinder 614 and the clamp 616 may be positioned near an interior side of the grommet 606 so that the cylinder 614 and clamp 616 secure the fiber optic cable as the fiber optic cable enters the fiber optic housing assembly 100 through the grommet 606. A diameter of the cylinder 614 may be greater than a diameter of the holes 608, preventing the cylinder 614 and the fiber optic cable from sliding out of the fiber optic housing assembly 100 through the holes 608.

Figure 7:
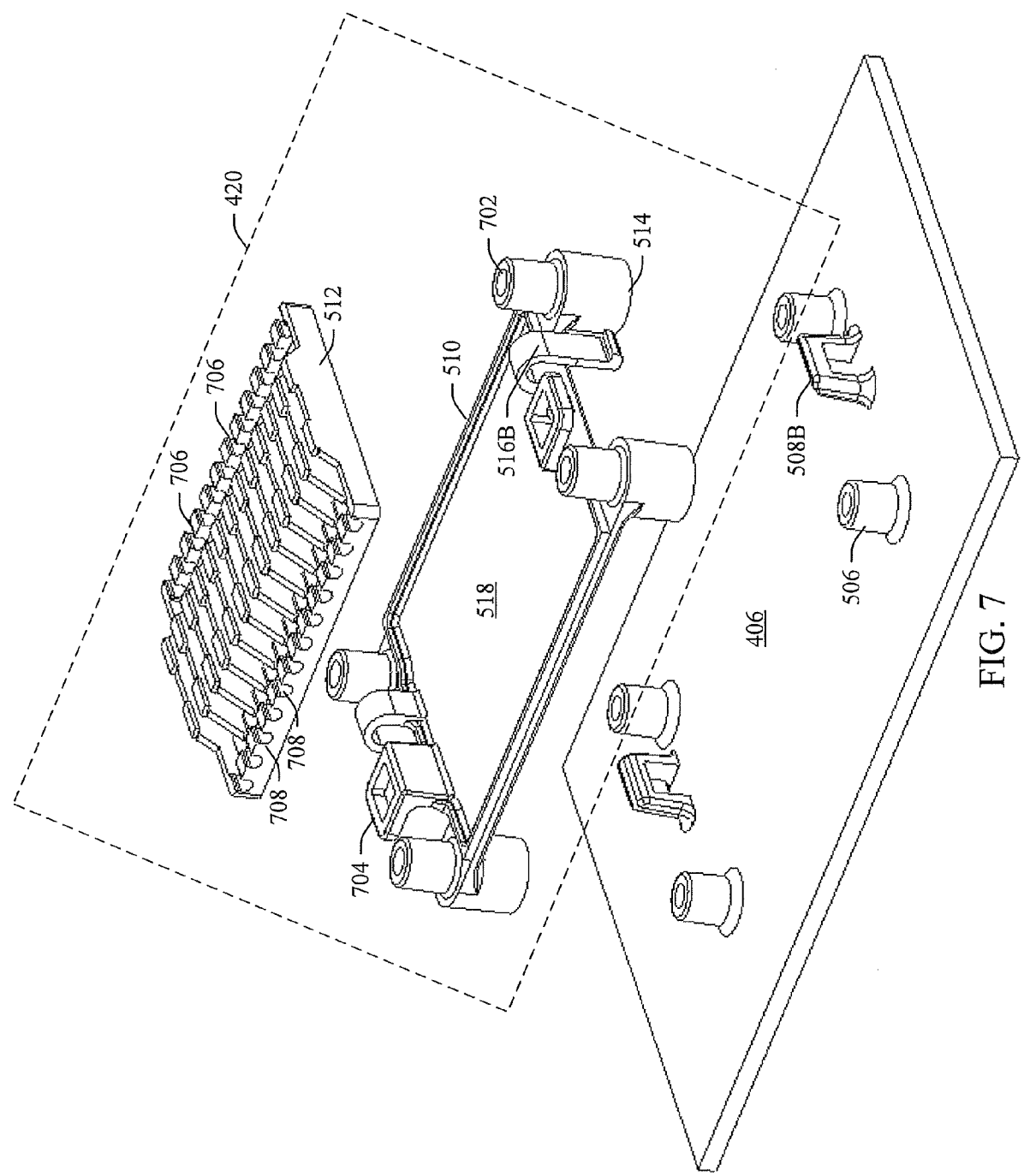
FIG. 7 is an exploded perspective view of a splice bracket assembly and bottom surface of a base according to an example embodiment.

FIG. 7 is an exploded perspective view of the splice bracket assembly 420 and the bottom surface 406 of the base 110 (not shown in FIG. 7) according to an example embodiment. In this embodiment, the frictional engagement mechanism of securing the splice bracket assembly 420 to the bottom surface 406 of the base 110 includes a rib 508*b* extending from the bottom surface 406 of the base 110, which rib 508A may form a loop extending from the bottom surface 406, and a flexible hook 516B extending from the mounting portion 510. In this embodiment, the splice bracket assembly 420 is secured to the base 110 by pressing the splice bracket assembly 420 downward, which cause the hook 516B to bend inward until the hook 516B slides past the rib 508*b*, causing the hook 516B to spring back into its original position, securing the splice bracket assembly 420 to the base 110.

In the embodiment shown in FIG. 7, the mounting portion 510 also includes a peg 702 corresponding to each aperture 514. The peg 702 is configured to allow another splice bracket assembly (not shown in FIG. 7, but shown in FIGS. 4 and 5) to be stacked on top of the splice bracket assembly 420 which is mounted onto the base 110. Multiple splice bracket assemblies (not shown) may be stacked on top of each other, according to an example embodiment. The peg 702 is configured to be received by an aperture 514 of the splice bracket assembly stacked onto the lower splice bracket assembly 420 which is mounted onto the base 110.

The mounting portion 510 shown in FIG. 7 also includes a rib 704 forming a loop which is configured to secure the stacked splice block assembly (not shown in FIG. 7) onto the lower splice block assembly 420 which is secured to the bottom surface 406. The stacked splice block assembly may be secured to the splice block assembly 420 using the hook 516B and rib 704 in the same manner that the splice block assembly 420 is secured to the bottom surface 406.

The example splice block 512 shown in FIG. 7 includes a plurality of ribs 706 extending perpendicularly from the splice block 512. The ribs 706 may be configured to partition one spliced fiber optic cable (or group of splices) from another spliced fiber optic cable (or group of splices). The example splice block 512 may further include a plurality of apertures 708 aligned with spaces between the ribs 706. The apertures 708 may receive the fiber optic cable and thereby help to secure the fiber optic cable to the splice block 512.

Figure 8:
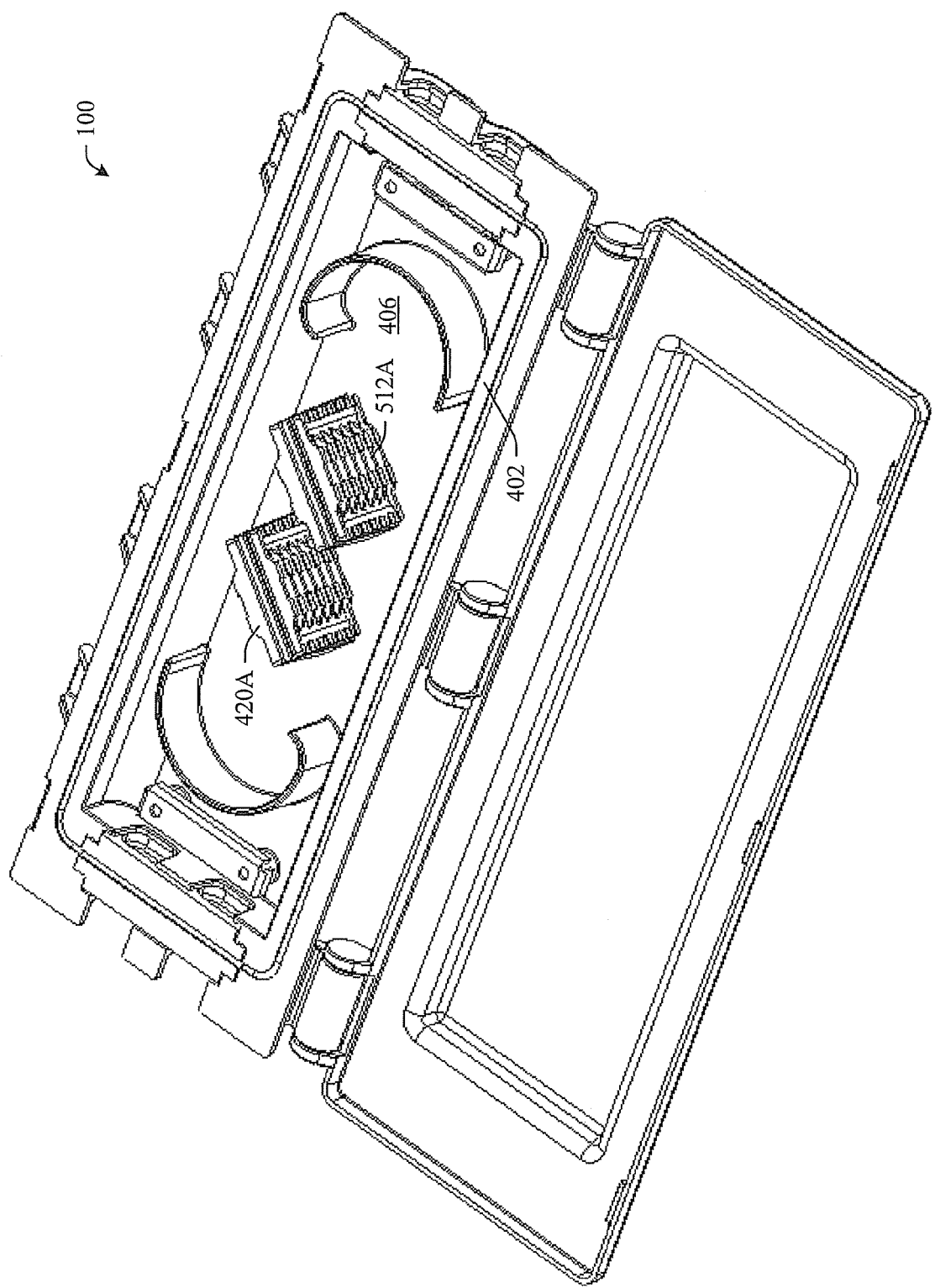
FIG. 8 is a perspective view of a fiber optic housing assembly in an open position according to an alternative example embodiment.

FIG. 8 is a perspective view of a fiber optic housing assembly 100 in an open position according to an alternative example embodiment. In this embodiment, two splice bracket assemblies 420A are secured to different portions of the bottom surface 406 of the base 110. Also in this embodiment, the splice blocks 512A face generally perpendicularly to the sidewalls 402, with an upward tilt, rather than facing upward away from the bottom surface 406, as in the example shown in FIGS. 4, 5, and 7.

Figure 9:
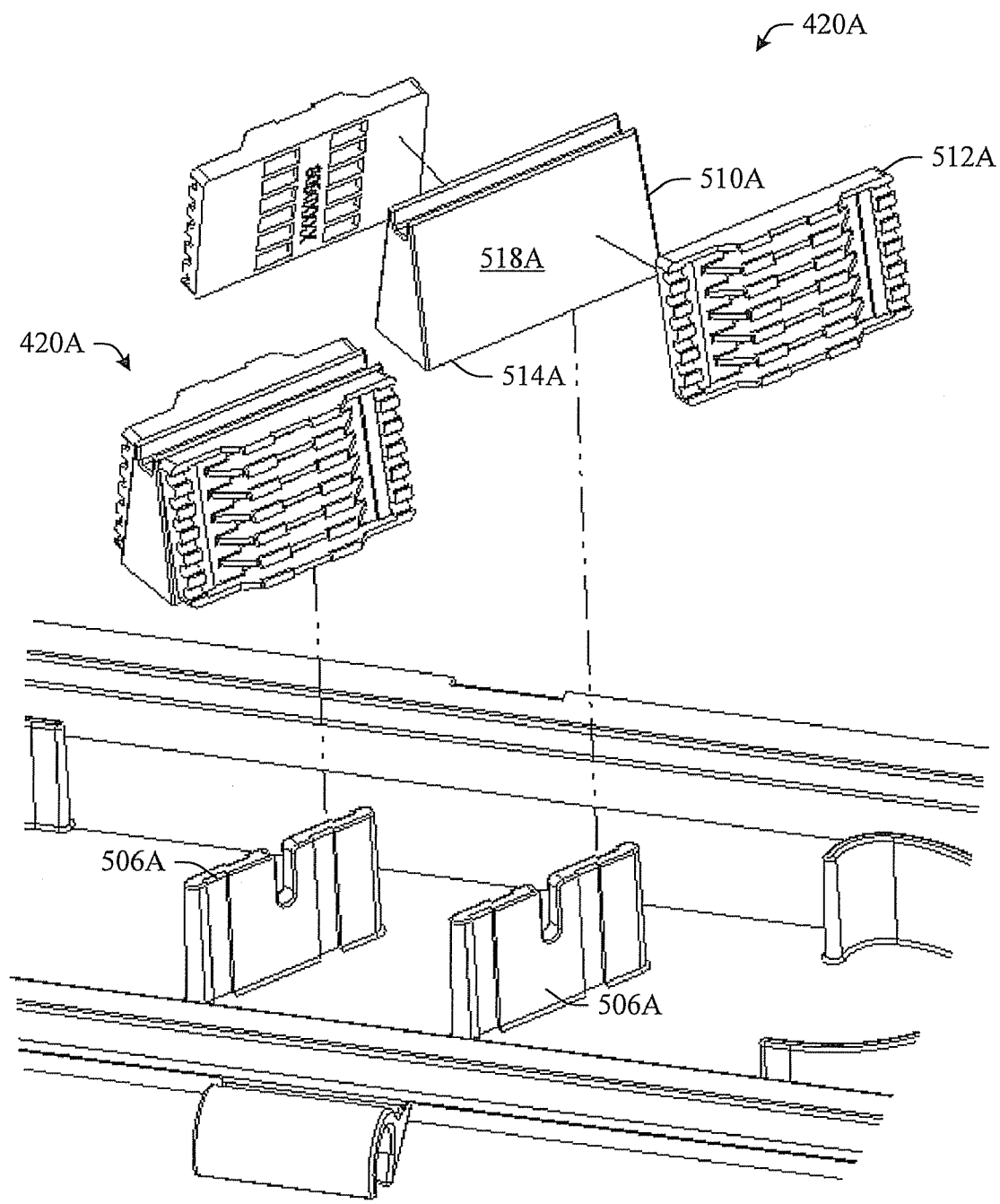
FIG. 9 is an exploded perspective view of splice bracket assemblies detached from the mounting portions of the base according to the alternative example embodiment shown in FIG. 8.

FIG. 9 is an exploded perspective view of splice bracket assemblies 420A detached from the mounting portions 506*a* of the base 110 according to the alternative example embodiment shown in FIG. 8. In this example embodiment, the mounting portions 506*a* of the base 110 are generally rectangular tabs configured to be received by the apertures 512A of the mounting portions 510A of the splice bracket assemblies 420A. The mounting portions 506*a* of the base 110 may include flexible tabs extending from the mounting portions 506*a* which are configured to lock into the apertures 514A of the splice bracket assemblies 420A. The mounting portions 510A of the splice bracket assemblies 420A may also include at least one, such as two, mounting surfaces 518A configured to allow the splice blocks 512A to be mounted to the mounting portions 510A, such as by an adhesive.

Figure 10:
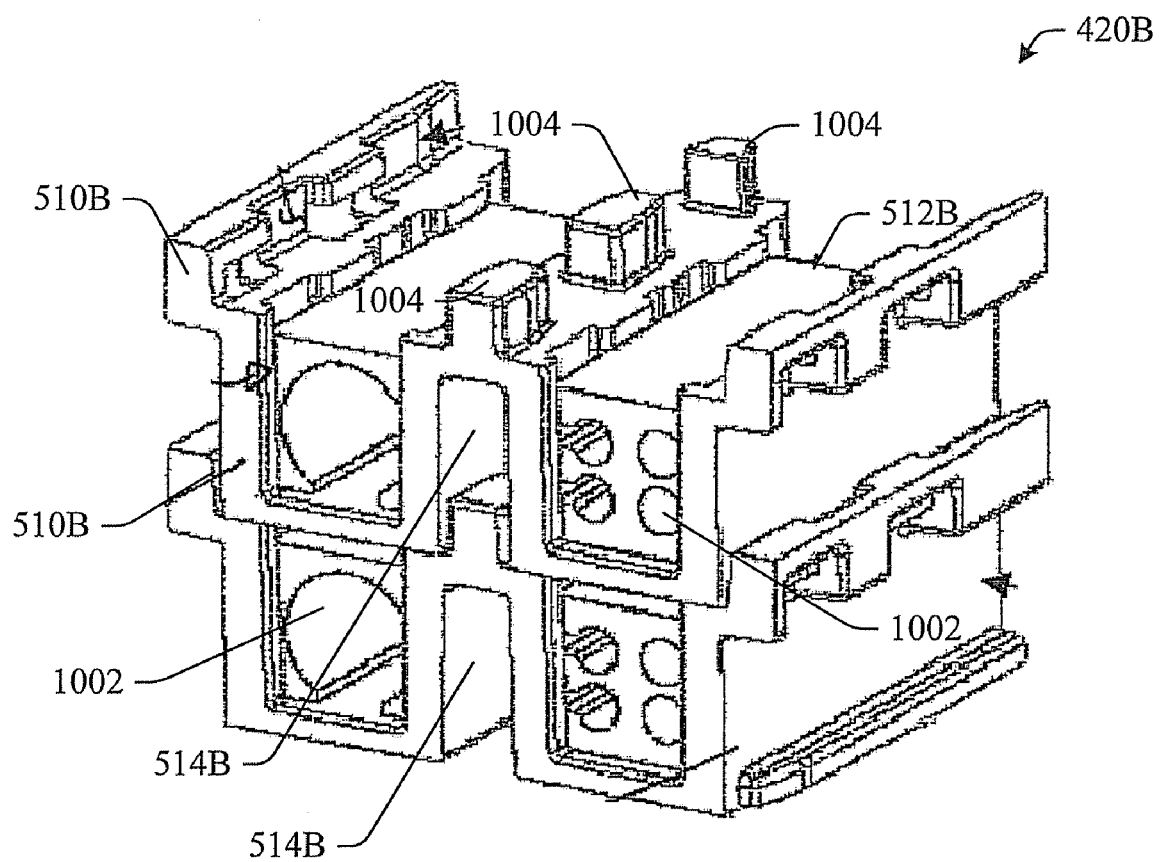
FIG. 10 is a perspective view of two splice bracket assemblies according to another alternative example embodiment.

FIG. 10 is a perspective view of two splice bracket assemblies 420B according to another alternative example embodiment. In this embodiment, the mounting portions 510B each include at least one, such as two, splice block apertures 1002 configured to receive the splice blocks 512B. The splice block apertures 1002 substitute for the mounting surfaces 518, 518A of the embodiments shown in FIGS. 4, 5, 7, 8, and 9. Instead of attaching the splice blocks 512B to the mounting portions 510B by an adhesive, the splice blocks 512B may simply be inserted into the splice block apertures 1002, from which the splice blocks 512B may easily be removed.

The mounting portions 510B may further include at least one aperture 514B for receiving a mounting portion 506B (not shown in FIG. 10) of the base 110 (not shown in FIG. 10). The mounting portions 510B may further include extensions 1004 configured to be received by the apertures 514B of another mounting portion 510B. The combination of the extensions 1004 and the apertures 514B enable one mounting portion 510B to be stacked on top of another mounting portion.

In the embodiment shown in FIG. 10, the splice blocks 512B are rectangular, and are configured to slide securely into the apertures 1002. The splice blocks 512B may include apertures 1002, which may be cylindrical, and which may be configured to receive the fiber optic cable. It is to be understood and appreciated that the rectangular shape of the embodiments shown can be substituted by most any other shape, for example, square and/or round without departing from the spirit and/or scope of the innovation and claims appended hereto.

Figure 11:
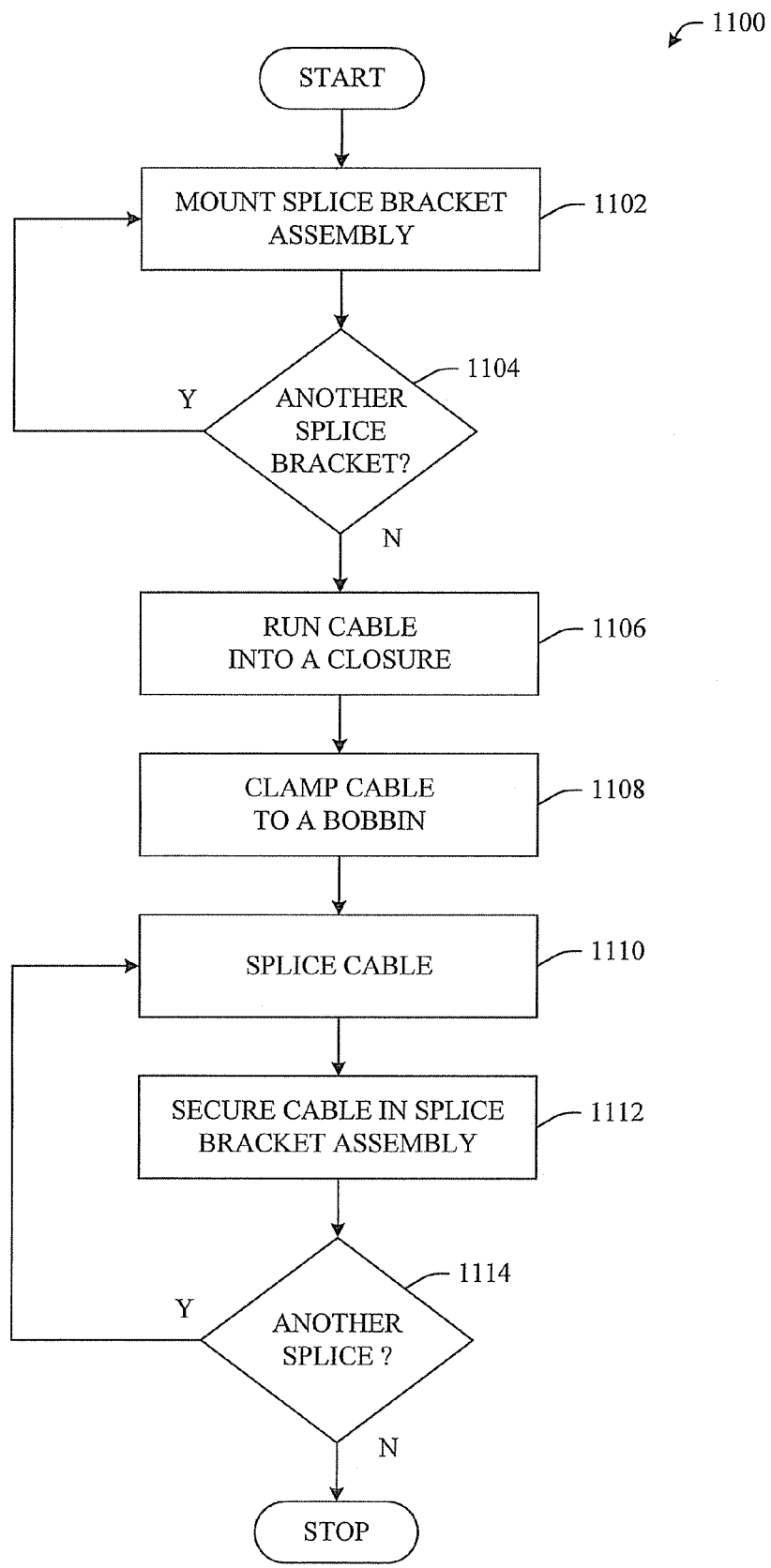
FIG. 11 is a flowchart showing a method of securing a fiber optic cable according to an example embodiment.

FIG. 11 is a flowchart showing a method 1100 of securing a fiber optic cable according to an example embodiment. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. Moreover, not all illustrated acts may be required to implement a methodology in accordance with the innovation.

At 1102, a splice bracket assembly is mounted into a closure. For example, a splice bracket assembly can be removeably mounted onto a mounting portion of an injection molded base of a fiber optic housing assembly. Next, at 1104, a determination is made if an additional splice bracket is to be included within the closure. If so, another splice bracket assembly can be mounted, for example, stacked within the closure.

At 1106, a fiber optic cable may be run through a hole of a grommet and into the interior portion of a closure. Next, at 1108, the fiber optic cable may be clamped to an outside surface of a bobbin. As described supra, because the bobbin has a diameter larger than the holes in the grommet, the bobbin secures the cables from pulling out of the closure.

A splice can be made in the fiber optic cable at 1110 and may be secured to the splice bracket assembly at 1112. At 1114, a determination can be made if additional splices are necessary. If so, the cables can be spliced and secured. If not, a stop block is reached. Essentially, when the stop block is reached, a cover of the fiber optic housing assembly may be closed, enclosing the splice bracket assembly or multiple splice bracket assemblies.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A fiber optic housing assembly comprising:
   a base including walls that define an interior recess and a mounting portion extending from a bottom surface of the base;
   at least one fiber optic cable receiver structure received by one of the walls of the base, the receiver structure includes a plurality of holes configured to receive a fiber optic cable;
   a cover pivotally connected to the base; and
   at least two splice bracket assemblies, wherein at least one of the splice bracket assemblies receives the mounting portion of the base;
   wherein the at least two splice bracket assemblies are stacked and secured to the base by a frictionally engaging mechanism; and
   wherein the base, the at least one fiber optic cable receiver structure, and the cover are configured to surround the interior recess of the base.

2. The fiber optic housing assembly of claim 1 wherein:
   the at least two splice bracket assemblies each include a mounting portion and a splice block;
   each mounting portion receives at least one of the at least two mounting portions of the base and is secured to the mounting portion of the base by the frictionally engaging mechanism; and
   the splice block is attached to the mounting portion by an adhesive or mechanical attachment.

3. The fiber optic housing assembly of claim 1 wherein:
   the at least two splice bracket assemblies each include a mounting portion and a splice block secured to each other;
   each splice block includes a plurality of parallel ribs extending from the splice block; and
   each splice block has a plurality of depressions aligned with spaces between the ribs, wherein the depressions are located along a perimeter of each splice block.

4. The fiber optic housing assembly of claim 1 further comprising:
   at least two stacked splice bracket assemblies, each of the two stacked splice bracket assemblies receives a mounting portion of one of the at least two splice bracket assemblies that are secured to the bottom surface of the base;
   wherein the at least two stacked splice bracket assemblies are secured to the at least two splice bracket assemblies that are secured to the base by a second frictionally engaging mechanism.

5. The fiber optic housing assembly of claim 1 wherein the frictionally engaging mechanism includes a hook extending from the bottom surface of the base.

6. The fiber optic housing assembly of claim 1 wherein the frictionally engaging mechanism includes a hook extending from the bottom surface of the base and a hole in the splice bracket assembly, the hole being configured to receive the hook.

7. The fiber optic housing assembly of claim 1 wherein:
   the at least one fiber optic cable receiver structure includes at least one recess receiving at least one grommet; and
   the at least one grommet includes the plurality of holes configured to receive the fiber optic cable.

8. The fiber optic housing assembly of claim 1 further comprising:
   at least one rib extending from the bottom surface of the base;
   wherein the at least one rib is semicircular with a radius of curvature of at least 1.5 inches; and
   wherein the at least one rib is located between the at least two splice bracket assemblies and the at least one fiber optic cable receiver; and
   wherein an open portion of the at least one rib faces the at least two splice bracket assemblies.

9. The fiber optic housing assembly of claim 1 wherein the base is injection molded and the cover is injection molded.

10. The fiber optic housing assembly of claim 1 wherein the pivotal connection between the base and the cover is configured to prevent the cover from pivoting more than approximately ninety degrees away from the base.

11. The fiber optic housing assembly of claim 1 wherein the base includes a tab extending from one of the walls away from the interior recess, the tab having a hole configured to receive a screw for mounting the fiber optic assembly above a ground surface.

12. The fiber optic housing assembly of claim 1 wherein:
   the walls of the base include a flat planar surface;
   the at least one fiber optic cable receiver structure includes a flat planar surface parallel to the flat planar surface of the walls of the base; and the cover includes a flat planar surface configured to rest along the flat planar surfaces of the walls of the base and the at least one fiber optic cable receiver structure when the fiber optic housing assembly is in a closed position.

13. The fiber optic housing assembly of claim 1 wherein:
the cover includes a flange extending from a surface of the cover and forming a loop;
the walls of the base include a first groove;
the at least one fiber optic cable receiver structure includes a second groove aligned with the first groove;
the first groove and the second groove together surround the interior recess of the base; and
the first groove and the second groove are configured to receive the flange.

14. The fiber optic housing assembly of claim 1 further comprising:
a flexible cylinder with a clamp around the flexible cylinder;
wherein the flexible cylinder with the clamp is positioned to receive the fiber optic cable between the flexible cylinder and the clamp as the fiber optic cable enters the fiber optic housing assembly through at least one of the plurality of holes.

15. The fiber optic housing assembly of claim 1 further comprising fasteners configured to secure the cover to the base in a closed position.

16. The fiber optic housing assembly of claim 1 wherein:
the walls of the base include at least one hole;
the walls of the base further include an uneven surface around the hole, the uneven surface being configured to frictionally engage a lock button; and
the cover includes a lock button configured to frictionally engage the uneven surface of the walls.

17. The fiber optic housing of claim 1 wherein the base, the at least one fiber optic cable receiver structure, and the cover are configured to form a waterproof seal when the cover is in a closed position.

18. A housing assembly comprising:
a base including sidewalls defining an interior space, at least two semicircular ribs extending upwardly from a bottom surface of the base, and at least two mounting portions extending upwardly from the bottom surface of the base and located between the at least two semicircular ribs;
at least two grommet housings, the at least two grommet housings being received by apertures in opposing portions of the sidewalls;
at least one grommet received by each of the at least two grommet housings, the grommets each having a plurality of holes configured to receive a fiber optic cable; and
a cover engaging a surface of the sidewalls and engaging a surface of each of the at least two grommet housings.

19. The fiber optic housing assembly of claim 18 wherein the cover is pivotally connected to the base and is restricted to opening to an angle of 90 degrees.

20. A method of securing a fiber optic cable comprising:
stacking at least two splice bracket assemblies onto a mounting portion of an injection molded base of a fiber optic housing assembly;
running the fiber optic cable through a hole of a grommet received by the fiber optic housing assembly;
clamping the fiber optic cable to an outside surface of a cylinder, said cylinder being inside the fiber optic housing assembly and having a diameter larger than the hole of the grommet;
securing the fiber optic cable to one of the splice bracket assemblies; and
closing a cover of the fiber optic housing assembly to enclose the splice bracket assemblies.

* * * * *